United States Patent
Kawano et al.

[11] Patent Number: 6,149,702
[45] Date of Patent: Nov. 21, 2000

[54] FILTERING MEDIUM FOR AIR FILTERS AND PROCESS FOR PRODUCING THE SAME

[75] Inventors: Eizo Kawano; Norikane Nabata; Takuya Maeoka, all of Osaka, Japan

[73] Assignee: Nitto Denko Corporation, Osaka, Japan

[21] Appl. No.: 09/315,946

[22] Filed: May 21, 1999

[30] Foreign Application Priority Data

Jun. 11, 1998 [JP] Japan ................................... 10-163879
Nov. 18, 1998 [JP] Japan ................................... 10-328252

[51] Int. Cl.⁷ ............................. B01D 29/07; B01D 46/10
[52] U.S. Cl. ............................... 55/497; 55/521; 55/528; 55/DIG. 5
[58] Field of Search ................ 96/4, 7–14; 55/497, 55/498, 514, 521, 524, 528, DIG. 5

[56] References Cited

U.S. PATENT DOCUMENTS

| | | | |
|---|---|---|---|
| 3,986,851 | 10/1976 | Grodek | 55/528 X |
| 4,324,574 | 4/1982 | Fagan | 55/528 X |
| 4,663,041 | 5/1987 | Miyagi et al. | 55/521 X |
| 4,816,328 | 3/1989 | Saville et al. | 55/528 X |
| 4,877,433 | 10/1989 | Oshitari | 55/528 X |
| 4,878,930 | 11/1989 | Manniso et al. | 55/521 X |
| 5,019,140 | 5/1991 | Bowser et al. | 55/524 X |
| 5,037,457 | 8/1991 | Goldsmith et al. | 96/12 |
| 5,082,472 | 1/1992 | Mallouk et al. | 96/12 X |
| 5,096,473 | 3/1992 | Sassa et al. | 55/528 X |
| 5,154,827 | 10/1992 | Ashelin et al. | 96/12 X |
| 5,207,812 | 5/1993 | Tronto et al. | 55/528 X |
| 5,234,739 | 8/1993 | Tanaru et al. | 428/131 |
| 5,478,372 | 12/1995 | Stark | 55/524 X |
| 5,507,847 | 4/1996 | George et al. | 55/486 |
| 5,820,645 | 10/1998 | Murphy, Jr. | 55/528 X |
| 5,888,275 | 3/1999 | Hamasaki et al. | 96/13 X |
| 5,928,414 | 7/1999 | Wnenchak et al. | 55/528 X |
| 6,027,553 | 2/2000 | Hirano et al. | 55/528 X |
| 6,030,428 | 2/2000 | Inhino et al. | 96/13 X |
| 6,030,484 | 2/2000 | Maeoka et al. | 55/528 X |

FOREIGN PATENT DOCUMENTS

| | | |
|---|---|---|
| 0 087 149 A2 | 8/1983 | European Pat. Off. . |
| 0 633 053 A1 | 1/1995 | European Pat. Off. . |
| 3-221541 | 9/1991 | Japan . |
| 5-202217 | 8/1993 | Japan . |

*Primary Examiner*—Robert H. Spitzer
*Attorney, Agent, or Firm*—Sughrue, Mion, Zinn, Macpeak & Seas, PLLC

[57] ABSTRACT

A filtering medium for air filters wherein its surface conditions have been improved, whereby the porous PTFE membrane is not damaged even after pleating, thus appropriately meeting needs for clean space in clean rooms. The filtering medium comprises a porous polytetrafluoroethylene membrane (2) and an air-permeable supporting member (1) which are laminated such that at least one of exposed surfaces comprises a surface of the air-permeable supporting member (1) having a maximum frictional resistance of 25 gf or less. This filtering medium can be obtained by, for example, press bonding the air-permeable supporting member (1) to the porous membrane (2) under heating and then pressing the surface of the air-permeable supporting member (1) to a silicone roll (4) for smoothing.

4 Claims, 1 Drawing Sheet

6,149,702

FILTERING MEDIUM FOR AIR FILTERS AND PROCESS FOR PRODUCING THE SAME

FIELD OF THE INVENTION

This invention relates to filtering media for air filters with the use of porous polytetrafluoroethylene (hereinafter referred to simply as "PTFE") membranes. More particularly, it relates to filtering media for air filters having as a collection layer a porous PTFE membrane which is appropriately used for collecting particles suspended in the atmosphere in clean rooms used in the fields of semiconductors, drugs, etc.

BACKGROUND OF THE INVENTION

As filtering media for air filters, there have been used those produced by blending glass fibers with binders and processed into a paper. However, these filtering media suffer from some problems, for example, the existence of fine fibers adhering thereto and self-dusting at the bending process. Further, when it contacts with specific chemicals such as hydrofluoric acid, these filtering media are deteriorated and undergo dusting.

PTFE is a clean material which is highly resistant to chemicals. Due to these characteristics, porous PTFE membranes have been employed in filtering media as high-performance for air filters to be used in clean rooms in the semiconductor industry. A porous PTFE membrane disclosed in JP-A-5-202217 is one example thereof (the term "JP-A" as used herein means an "unexamined published Japanese patent application"). It has been a practice to laminate a porous PTFE membrane onto an air-permeable supporting member for reinforcement to give a filtering medium. The thus obtained filtering medium is pleated so as to give a continuous W-shaped structure (hereinafter referred to as "pleating") and framed, thus giving an air filter.

Pleating methods commonly employed in the art involve the reciprocating method and the rotary method. The rotary method is advantageous from the viewpoint of productivity, while the reciprocating method is advantageous in giving a favorable pleated appearance. When a filtering medium composed of a porous PTFE membrane and an air-permeable supporting member for reinforcement is pleated, there arises a problem that the filtering medium is damaged and thus pinholes are formed. As a result, the filter thus obtained suffers from leakage.

SUMMARY OF THE INVENTION

The present invention has been made to overcome the above-described problems encountering in the prior art.

One object of the present invention is to provide a filtering medium for air filters wherein a porous PTFE membrane is not damaged even after pleating, thus appropriately meeting needs for clean space in clean rooms.

Another object of the present invention is to provide a process for producing the filtering medium.

To achieve the above object, the present invention provides a filtering medium for air filters, which comprises a laminate of a porous PTFE membrane and an air-permeable supporting member, wherein at least one of the two exposed surfaces comprises a surface of the air-permeable supporting member having a maximum frictional resistance of 25 gf or less.

The present invention also provides a process for producing a filtering medium for air filters comprising a laminate of a porous polytetrafluoroethylene membrane and an air-permeable supporting member, which comprises the step of heating said air-permeable supporting member, and the step of pressing the surface of the thus heated air-permeable supporting member to a smoothing member.

Figure 1:
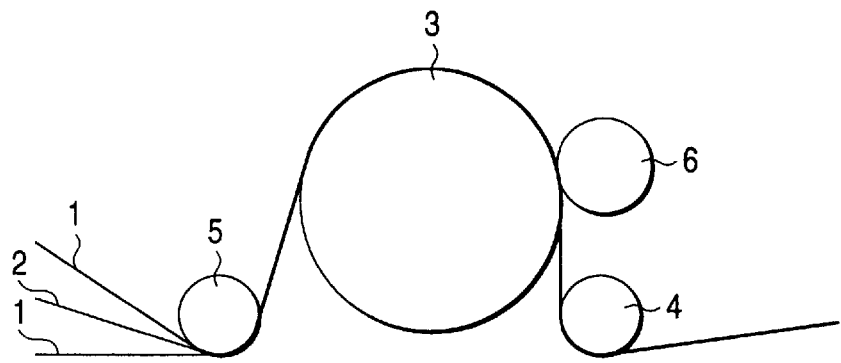
FIG. 1 is a schematic view showing one example of a device for producing the filtering medium for air filters according to the present invention.

In these drawings, each numerical symbol shows as follows:

1: Air-permeable supporting member
2: Porous PTFE membrane
3: Heating roll
4: Silicone roll
5: Guide roll
6: Pinch roll.

DETAILED DESCRIPTION OF THE INVENTION

The term "maximum frictional resistance" as used herein means a value determined by using a Bowden-Leben type reciprocating frictional test machine under the conditions as specified below.

Sliding material: Steel ball of 10 mm in diameter (in accordance with JIS B 1501).
Sliding speed: 700 mm/min.
Load: 100 gf
Sliding distance: 40 mm Static friction resistance and dynamic friction resistance are thus measured and the maximum thereof is defined as the maximum frictional resistance.

The pinhole formation, which has been a serious problem in the art, is considered to proceed as follows.

1. A blade, which partly presses the filtering medium surface so as to form crests and roots, slides over the filtering medium surface.

2. A shear stress arises within the filtering medium due to the frictional force between the filtering medium and the blade.

3. This shear stress arises intensively at the bonding part of the porous PTFE membrane to the air-permeable supporting member in the filtering medium. As a result, the porous structure of the porous PTFE membrane having a relatively low strength is broken.

However, in the filtering medium for air filters according to the present invention, at least one of the exposed surfaces has a maximum frictional resistance of 25 gf or less, and preferably 20 gf or less. Therefore, no excessive frictional resistance arises between the blade and the filtering medium, even though it is pleated with the use of a reciprocating pleating machine, etc. As a result, the shear stress applied on the filtering medium is reduced and thus pinholes are scarcely formed in the porous PTFE membrane. The lower limit of the maximum frictional resistance is not particularly limited, but is usually 2 gf.

The process for producing a filtering medium for air filters according to the present invention is to produce a filtering medium for air filters comprising a laminate of a porous PTFE membrane and an air-permeable supporting member, and comprises the step of heating the air-permeable supporting member and the step of pressing the surface of the thus heated air-permeable supporting member to a smoothing member.

The process according to the present invention makes it possible to provide a filtering medium for air filters which has a smooth surface and is hardly damaged in the porous PTFE film even after pleating. When expressed in the maximum frictional resistance as defined above, the surface of the air-permeable supporting member is made smooth to an extent of 25 gf or less, preferably 20 gf or less. In the step of laminating the porous PTFE membrane onto the air-permeable supporting member, which is performed before or after the smoothing step, the surface of the air-permeable supporting member is provided as the exposed surface of the filtering medium for air filters.

In the above-described process for producing a filtering medium for air filters, it is preferable that the air-permeable supporting member is pressed to a smoothing member under heating to a temperature at which the uneven surface of the air-permeable supporting member can be deformed by pressing. More particularly, it is preferable that the air-permeable supporting member is pressed to the smoothing member under heating to the softening point or above of at least one material constituting the air-permeable supporting member.

The filtering medium for air filters of the present invention comprises a laminate of a porous PTFE membrane and an air-permeable supporting member to be used for protecting and reinforcing the membrane. The air-permeable supporting member also gives a nerve required in pleating, to the filtering medium.

The porous PTFE membrane can be obtained by conventional methods. For example, a mixture of unsintered PTFE powder with a liquid lubricant (naphtha, etc.) is molded into a film by extrusion or rolling. After removing the liquid lubricant, the unsintered film is made porous by stretching. In usual, the film is sintered after completion of the stretching by heating to the melting point of PTFE or above to thereby increase the strength.

The porous PTFE membrane may be an arbitrary one without restriction in pore size, thickness, porosity, etc., so long as it can exhibit the desired collection performance according to the purpose of use. To obtain a filtering medium usable in clean rooms for semiconductors, etc., it is preferable that the porous PTFE membrane has a PF (Performance of Filter) value exceeding 20. The PF value is calculated in accordance with the following formula:

PF value={(-log permeability)/pressure loss}×100

On the other hand, the air-permeable supporting member is not particularly limited in material, structure or form. Materials which are superior in air-permeability to the porous PTFE membrane can be used. Examples thereof include non-woven fabrics, woven fabrics, meshes (net sheets) and other porous materials. Non-woven fabrics are preferably used from the standpoints of strength, flexibility and workability. Where the maximum frictional resistance of the surface of the filtering medium is decreased by the procedures as will be described hereinafter, it is preferable that a part or all of the fibers constituting the non-woven fabric is a composite fiber having a core-shell structure and the core component is a synthetic fiber having a melting point relatively higher than that of the shell component. The material for the air-permeable supporting member is not particularly limited, and examples thereof which can be used include polyolefins (polyethylene (PE), polypropylene (PP), etc.), polyamides, polyesters (polyethylene terephthalate (PET), etc.), aromatic polyamides, and composite materials thereof.

In the laminate, the porous PTFE membrane and the air-permeable supporting member may be alternately laminated each other. Alternatively, either one or both of the porous PTFE membrane and the air-permeable supporting member may be continuously laminated in some part. Also, an adhesive material may be located between these layers.

Figure 2:
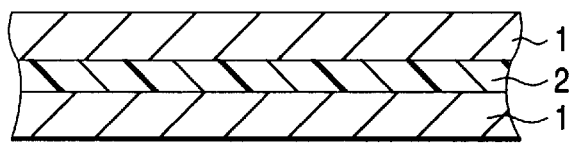
FIG. 2 is a sectional view showing one example of a constitution of the filtering medium for air filters according to the present invention.
Figure 3:
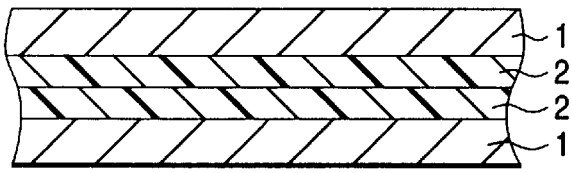
FIG. 3 is a sectional view showing another example of a constitution of the filtering medium for air filters according to the present invention.
Figure 4:
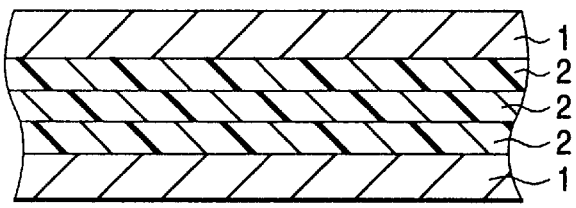
FIG. 4 is a sectional view of still another example of a constitution of the filtering medium for air filters according to the present invention.
Figure 5:
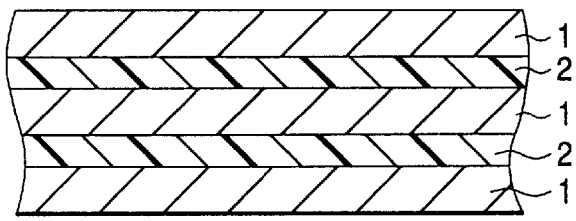
FIG. 5 is a sectional view of a further example of a constitution of the filtering medium for air filters according to the present invention.

FIGS. 2 to 5 show some examples of the filtering media for air filters comprising these laminates. It is preferable that the air-permeable supporting member (1) is located as the outermost layer of the filtering medium for air filters. To effectively prevent the formation of pinholes, it is preferable that the filtering medium for air filters includes at least two layers of the porous PTFE membrane (2), as shown in FIGS. 3 to 5. It is more preferable that the air-permeable supporting member (1) is inserted between the porous PTFE membranes (2) as shown in FIG. 5, so that the shear stress during pleating is relieved. This laminate may consist of two layers wherein the air-permeable supporting member is located on one surface of the porous PTFE membrane. At least one of the outermost surfaces (i.e., the exposed surfaces of the laminate), preferably both of them, have a maximum frictional resistance of 25 gf or less.

These laminates can be produced by arbitrary methods without restriction. For example, there may be used an adhesive lamination method and a heat lamination method. In the heat lamination method, an air-permeable supporting member such as a non-woven fabric is partly molten by heating and then laminated. It is also possible to use a fusion binder such as hot melt powder. On the other hand, a method for mutually laminating porous PTFE membranes includes a method for press laminating in membrane formation, a heat fusion method, etc.

The surface of the air-permeable supporting member can be smoothed by, for example, using a method involving the step of heating the air-permeable supporting member to a temperature at which the smooth surface of the air-permeable supporting member can be deformed by pressing and the step of pressing the surface of the air-permeable supporting member to the smoothing member to thereby give a smooth surface.

In the step of heating the air-permeable supporting member, the air-permeable supporting member is heated to the softening point or above (preferably to the melting point or above) of at least one material constituting the same. Although the upper limit of the heating temperature is not particularly limited, it is preferable in practice to define the upper limit as the temperature higher by 100° C. than the melting point of the air-permeable supporting member. The heating temperature of the air-permeable supporting member may be appropriately determined depending on the material of the air-permeable supporting member, the time required from heating to smoothing, etc. When the air-permeable supporting member contains composite fibers of the core-shell structure wherein the core component has a melting point higher than that of the shell component, for example, it is preferable to heat the air-permeable supporting member to a temperature corresponding to the softening point (preferably the melting point) or higher of the shell component but lower than the melting point of the core component.

The air-permeable supporting member may be heated by, for example, bringing the air-permeable supporting member into contact with a heating member (for example, a heating roll) which has been heated to a definite temperature. It is particularly preferable to bring the air-permeable supporting member into contact with the heating roll, since the heating procedure can be continuously performed in this case.

After completion of the heating, the air-permeable supporting member is pressed to the smoothing member. Thus, the surface of the air-permeable supporting member being in contact with the smoothing member is smoothed by the pressure. The smoothing member is not particularly limited, so long as it is provided with surface capable of smoothing the surface of the air-permeable supporting member. For example, a silicone member is usable therefor. When the smoothing member is shaped into a roll, the smoothing procedure can be continuously carried out. A silicone roll, for example, is used as such a roll. The smoothing member may be provided with a temperature controlling system.

It is preferable that the air-permeable supporting member is brought into contact with the smoothing member at a temperature corresponding to the softening point or above of at least one material constituting the air-permeable supporting member. For example, when the air-permeable supporting member contains composite fibers of the core-shell structure wherein the core component has a melting point higher than that of the shell component, it is preferable to heat the air-permeable supporting member in the smoothing step to a temperature corresponding to the softening point of the shell component or above. To prevent temperature drop during the smoothing step following the heating step, it is preferable to complete the heating and smoothing as quickly as possible.

It is preferable that the process as described above is used together with the heat lamination method for producing a laminate. A filtering medium for air filters provided with an exposed surface having a low frictional resistance can be efficiently produced by laminating the porous PTFE membrane onto the air-permeable supporting member under heating and then pressing the surface of the air-permeable supporting member serving as the exposed surface to the smoothing member.

The process as described above can be efficiently performed by using a device provided with a heating roll and a smoothing roll (preferably a silicone roll) located adjacent to the heating roll. To form a laminate of the porous PTFE membrane and the air-permeable supporting member by the heat lamination method, it is preferable that a contact bonding roll is located oppositely to the heating roll, and the air-permeable supporting member and the porous PTFE membrane are heat-laminated using these rolls.

FIG. 1 shows a device for carrying out the above-described process. FIG. 1 shows one example of the process whereby a filtering medium having a laminated structure as shown in FIG. 2 (air-permeable supporting member/porous PTFE membrane/air-permeable supporting member) is continuously produced. As FIG. 1 shows, air-permeable supporting members (1) and a porous PTFE membrane (2) are fed into a guide roll (5) in such a state that the porous PTFE membrane (2) is inserted between the air-permeable supporting members (1). These materials, which overlap each other, pass around the outer periphery of the heating roll (3), thereby heating to, for example, a temperature higher than the melting point of the air-permeable supporting member (1). These materials are contact bonded to each other while they pass between a pinch roll (6) and the heating roll (3). The thus formed laminate is then delivered via the outer periphery of a silicone roll (4) which is provided as a smoothing member near the heating roll (3). This silicone roll has a smooth surface. The exposed surface of the laminate is brought into contact with this smooth surface of the silicone roll (4), pressed to the same and then smoothed.

Alternatively, the air-permeable supporting member surface may be smoothed by, for example, using a calendar roll. It is also possible that the air-permeable supporting member surface is first smoothed and the air-permeable supporting member is then laminated onto the porous PTFE membrane.

Use of the filtering medium for air filters as described above makes it possible to maintain a low frictional resistance to a blade even in the process of pleating with the use of a reciprocating pleating machine and to reduce the shear stress applied onto the filtering medium. Thus, the damage of the porous PTFE membrane serving as the collection layer can be relieved and an air filter suffering from little leakage can be obtained.

The present invention will be described in greater detail by reference to the following Examples and Comparative Examples, but it should be understood that the invention is not construed as being limited thereto.

EXAMPLE 1

By using a device similar to the one shown in FIG. 1, a sintered porous PTFE membrane (thickness: 10 μm, porosity: 93%, average pore size: 0.7 μm, pressure loss: 35 mmH$_2$O, collection efficiency: 99.999995%, PF value: 21) and a PET/PE core-shell type non-woven fabric (thickness: 150 μm, basis weight: 30 g/m$^2$) (ELEVES TO303WDO, manufactured by Unitika Ltd., melting point of PE in shell: 129° C., softening point of the same PE: 74° C., melting point of PET in core: 261° C.) were heat-laminated (heating roll temperature: 160° C.) to obtain a three-layered filtering medium having the porous PTFE membrane as the intermediate layer. The three-layered laminate, which had been obtained by press bonding the porous membrane to the non-woven fabric by passing between a pinch roll and the heating roll, was brought into contact with a silicone roll serving as a smoothing member at a temperature of the non-woven fabric of 124° C.

The softening point of the above-mentioned non-woven fabric was measured by the penetration mode with the use of an apparatus TMA (Thermo Mechanical Analysis)/SS120C (manufactured by Seiko Instruments) under the following conditions.

Probe diameter: 1 mm

Load: 4 g

Heating rate: 5° C./min.

When measured by the above-described method with the use of a Bowden-Leben type reciprocating frictional test machine AFT-15B (manufactured by A and D Co.), the maximum frictional resistance of the silicone roll-contact surface of the obtained filtering medium and that of the non-contact surface thereof were 9.9 gf and 27.0 gf respectively.

EXAMPLE 2

A filtering medium was obtained in the same manner as in Example 1 except that the temperature of the heating roll was 150° C. The three-layered laminate, which had been obtained by press bonding the porous membrane to the non-woven fabric, was brought into contact with a silicone roll serving as a smoothing member at a temperature of the non-woven fabric of 115° C. When measured by the above-mentioned method, the maximum frictional resistance of the silicone roll-contact surface of the obtained filtering medium and that of the non-contact surface thereof were 16.3 gf and 28.6 gf respectively.

EXAMPLE 3

A filtering medium was obtained in the same manner as in Example 1 except that the temperature of the heating roll was 140° C. The three-layered laminate, which had been obtained by press bonding the porous membrane to the non-woven fabric, was brought into contact with a silicone roll serving as a smoothing member at a temperature of the non-woven fabric of 104° C. When measured by the above-described method, the maximum frictional resistance of the silicone roll-contact surface of the obtained filtering medium and that of the non-contact surface thereof were 22.3 gf and 28.1 gf respectively.

EXAMPLE 4

The filtering medium obtained in Example 1 was turned over and passed again through the roll of the same type of the device as shown in FIG. 1 (roll temperature: 160° C.). It was then brought into contact with the silicone roll, thereby obtaining a filtering medium having been smoothed in both of the exposed surfaces. The filtering medium was brought into contact with a silicone roll serving as a smoothing member at a temperature of the non-woven fabric of 122° C. When measured by the above-described method, the maximum frictional resistance of the surface of the filtering medium which was first brought into contact with the silicone roll was 9.9 gf while the maximum frictional resistance of another surface which was subsequently brought into contact therewith was 11.1 gf.

EXAMPLE 5

A porous PTFE membrane and a PET/PE core-shell type non-woven fabric, each being the same as used in Example 1, were laminated by passing a pair of rolls at a roll temperature of 140° C. The obtained two-layered laminate was then used as outer layers as a substitute for the air-permeable supporting member (1) as shown in FIG. 1. Further, the porous PTFE membrane (2) was substituted by a PET/PE core-shell type non-woven fabric (the same as used in Example 1). These layers were heat-laminated at a roll temperature of 160° C. to thereby obtain a five-layered filtering medium composed of non-woven fabric/porous PTFE membrane/non-woven fabric/porous PTFE membrane/non-woven fabric. The filtering medium was brought into contact with a silicone roll at a temperature of the non-woven fabric of 121° C. When measured by the above-described method, the maximum frictional resistance of the silicone roll-contact surface of the obtained filtering medium and that of the non-contact surface thereof were 12.5 gf and 28.0 gf respectively.

EXAMPLE 6

A non-woven PET fabric (SYNTEX MY R-200, manufactured by Mitsui Petrochemical Industries, Ltd., thickness: 170 µm, basis weight: 32 g/m², melting point: 256° C.) was passed through a calendar roll at a roll temperature of 100° C. to smooth both surfaces of the non-woven fabric. A low density polyethylene powder (melting point: 97.5° C., 30 mesh pass) was uniformly sprayed onto one surface of this non-woven fabric in an amount of 10 g/m² and bonded by heat fusion at 120° C.

This non-woven fabric having been smoothed in both surfaces was located on both surfaces of a porous PTFE membrane (the same as used in Example 1) in such a manner that the surface with the sprayed powder was in contact with the porous PTFE membrane. These layers were heat laminated at a roll temperature of 140° C. with the same device as shown in FIG. 1 but provided with no silicone roll (4). Thus, a three-layered filtering medium having the porous PTFE membrane as the intermediate layer was obtained.

When measured by the above-described method, the maximum frictional resistances of both surfaces of the filtering medium thus obtained were 13.5 gf and 14.6 gf respectively.

COMPARATIVE EXAMPLE 1

A filter medium was obtained in the same manner as in Example 1 except for omitting the step of bringing into contact with the silicone roll. When measured by the above-described method, the maximum frictional resistances of both surfaces of the filtering medium thus obtained were 26.9 gf and 28.2 gf respectively.

COMPARATIVE EXAMPLE 2

A filter medium having a three-layered structure was obtained in the same manner as in Example 6 except for omitting the step of smoothing the surface of the non-woven fabric using the calendar roll. When measured by the above-described method, the maximum frictional resistances of both surfaces of the filtering medium thus obtained were 29.0 gf and 27.6 gf, respectively.

The filtering media for air filters obtained in the above Examples 1 to 6 and Comparative Examples 1 and 2 were pleated with the use of a reciprocating pleating machine. The collection performance of each filtering medium was measured and occurrence of leakage was examined using 30 samples by the following method.

1. A space was separated into the upstream part and the down stream part using the air filtering medium (measurement area: 100 cm²) as a barrier.

2. Cold DOP (dioctyl phthalate) test particles were introduced into the upstream part and sucked from the downstream part at a face speed of 5.3 cm/sec.

3. The particle concentration in the upstream part and the concentration of the leaked particles in the downstream part were measured with a laser particle counter (LPC).

4. When the following relationship was satisfied, it was considered that leakage arose:

$$P_{0.2}/P_{0.1} > 0.1$$

wherein $P_{0.1}$ represents the permeability of particles having a particle size of 0.1 to 0.2 µm; and $P_{0.2}$ represents the permeability of particles having a particle size of 0.2 to 0.3 µm.

The following Table shows the leakage frequencies.

TABLE

|  | Ex. 1 | Ex. 2 | Ex. 3 | Ex. 4 | Ex. 5 | Ex. 6 | Comparative Ex. 1 | Comparative Ex. 2 |
|---|---|---|---|---|---|---|---|---|
| Leakage Frequency | 0/30 | 1/30 | 4/30 | 0/30 | 0/30 | 0/30 | 10/30 | 17/30 |

It is apparent from the above Table that filtering media for air filters showing a maximum frictional resistance of 25 gf or less in at least one of the exposed surfaces suffer from little pinhole formation even after pleating by the reciprocating method which would often damage filtering media.

As described above, the present invention provides filtering media for air filters which suffer from little pinhole formation even after pleating and thus appropriately meet needs for maintaining clean space in clean rooms.

While the invention has been described in detail and with reference to specific embodiments thereof, it will be apparent to one skilled in the art that various changes and modifications can be made therein without departing from the spirit and scope thereof.

What is claimed is:

1. A filtering medium for air filters, comprising a laminate of a porous polytetrafluoroethylene membrane and an air-permeable supporting member, wherein at least one of exposed surfaces of the filtering medium comprises a surface of said air-permeable supporting member having a maximum frictional resistance of 25 gf or less.

2. The filtering medium for air filters as claimed in claim 1, wherein at least one of the exposed surfaces comprises the surface of said air-permeable supporting member having a maximum frictional resistance of 20 gf or less.

3. A process for producing a filtering medium for air filters comprising a laminate of a porous polytetrafluoroethylene membrane and an air-permeable supporting member, which comprises the step of heating said air-permeable supporting member, and the step of pressing the surface of the thus heated air-permeable supporting member to a smoothing member.

4. The process for producing a filtering medium for air filters as claimed in claim 3, wherein said air-permeable supporting member is pressed to said smoothing member under heating to a softening point or above of at least one material constituting said air-permeable supporting member.

* * * * *